US011327180B2

(12) United States Patent
Mueller et al.

(10) Patent No.: US 11,327,180 B2
(45) Date of Patent: May 10, 2022

(54) SELECTIVE LOCATION-AGNOSTIC BROADCAST OF CORRECTIVE VEHICLE POSITIONING INFORMATION USING A HYPER-PRECISE-POSITIONING PROXY

(71) Applicants: AT&T Intellectual Property I, L.P., Atlanta, GA (US); AT&T Mobility II LLC, Atlanta, GA (US)

(72) Inventors: Julius Mueller, East Palo Alto, CA (US); Erie Lai Har Lau, Redmond, WA (US); Reza Hussain Hussaini, Redmond, WA (US); Hendrawan Susanto, Issaquah, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 268 days.

(21) Appl. No.: 16/512,302

(22) Filed: Jul. 15, 2019

(65) Prior Publication Data
US 2021/0018630 A1     Jan. 21, 2021

(51) Int. Cl.
  *H04L 29/08*     (2006.01)
  *G01S 19/07*     (2010.01)
  *H04L 67/56*     (2022.01)

(52) U.S. Cl.
  CPC ............ *G01S 19/073* (2019.08); *H04L 67/28* (2013.01)

(58) Field of Classification Search
  CPC ....... G01S 19/073; G01S 19/14; H04L 67/12; H04L 67/28
  See application file for complete search history.

(56) References Cited

U.S. PATENT DOCUMENTS

| | | | |
|---|---|---|---|
| 9,596,570 B1 * | 3/2017 | Cardoso de Moura | ...................... H04L 67/1004 |
| 2004/0203850 A1 * | 10/2004 | Oesterling | ............. G01C 21/28 455/456.1 |

(Continued)

OTHER PUBLICATIONS

"Broadcast Channel (BCCH) Update Procedure (SIB Contents)" last updated Jan. 15, 2009, retrieved from [http://rfmw.em.keysight.com/rfcomms/refdocs/wcdma/wcdma_gen_bse_bcch_proc.html], retrieved on May 28, 2019, 5 pages.

(Continued)

*Primary Examiner* — Gil H. Lee
(74) *Attorney, Agent, or Firm* — Amin, Turocy & Watson, LLP

(57) ABSTRACT

Selective broadcast of corrective vehicle positioning information using a hyper-precise-positioning (HPP) proxy is presented herein. A system can obtain satellite navigation correction data; assign respective portions of the satellite navigation correction data to defined geographical regions to facilitate respective point-to-multipoint wireless broadcasts of the respective portions of the satellite navigation correction data to respective vehicles that have been determined to be located within the defined geographical regions; and distribute, via respective signaling planes, broadcast requests comprising the respective portions of the satellite navigation correction data to respective wireless access point devices to facilitate the respective point-to-multipoint wireless broadcasts of the respective portions of the satellite navigation correction data—such satellite navigation correction data facilitating correction of satellite navigation data that has been received by the respective vehicles.

20 Claims, 11 Drawing Sheets

(56) References Cited

U.S. PATENT DOCUMENTS

2017/0171814 A1   6/2017  Belghoul et al.
2018/0306929 A1*  10/2018 Park ........................ H04W 4/06
2019/0196022 A1*  6/2019  Rezaei .................... G01S 19/41

OTHER PUBLICATIONS

Akhundov, Ziya. "Information Blocks in LTE", TelecomPedia, retrieved from [http://telecompedia.net/informationblocksinlte/], retrieved on May 28, 2019, 4 pages.

"Realtime kinematic", Wikipedia, retrieved from [https://en.rn.wikipedia.org/wiki/Realtime_kinematic], retrieved on Jun. 11, 2019, 5 pages.

"Satellite navigation", Wikipedia, retrieved from [https://en.wikipedia.org/wiki/Satellite_navigation], retrieved on May 28, 2019, 6 pages.

"ETWS detailed in LTE and UMTS" The 3G4G Blog, dated Mar. 9, 2011, retrieved from [https://blog.3g4g.co.uk/2011/03/etwsdetailedinlteandumts.html], retrieved on May 21, 2019, 12 pages.

"What is SIB in LTE?", Long Term Evolution | 4G, dated May 2017, retrieved from [https://ltebasics.wordpress.com/2017/05/16/what_is_sib_in_lte/], retrieved on May 28, 2019, 4 pages.

* cited by examiner

500

REQUEST TO ACCESS FEE-BASED
SATELLITE NAVIGATION
CORRECTION DATA BROADCAST
SERVICE

HYPER-PRECISE-POSITIONING
(HPP) PROXY COMPONENT 110

SATELLITE NAVIGATION
CORRECTION DATA BROADCAST
ENABLEMENT COMPONENT 510

FIG. 5

SELECTIVE LOCATION-AGNOSTIC BROADCAST OF CORRECTIVE VEHICLE POSITIONING INFORMATION USING A HYPER-PRECISE-POSITIONING PROXY

TECHNICAL FIELD

The subject disclosure generally relates to embodiments for selective location-agnostic broadcast of corrective vehicle positioning information using a hyper-precise-positioning (HPP) proxy.

BACKGROUND

Conventional vehicle technologies have had some drawbacks with respect to controlling a position of a vehicle, e.g., within a defined distance of another vehicle, under lane-change conditions, etc. due to lack of accurate, timely, etc. vehicle positioning information. Further, such technologies have had some drawbacks with respect to controlling the position of the vehicle using sensors, cameras, etc. under adverse weather and/or road conditions, e.g., heavy rain, snow, construction zones, etc. Furthermore, installing redundant sensors to account for faulty, damaged, etc. sensors increases vehicle costs. In addition, poor and/or altered road conditions, e.g., due to a lack of consistent road markings and/or signage, temporary construction zones, etc. can impede the ability of sensors to control the position of an automated vehicle.

Consequently, conventional vehicle technologies have had some drawbacks with respect to providing a safe, automated vehicle experience, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 5 illustrates an HPP proxy component comprising a satellite navigation correction data broadcast enablement component, in accordance with various example embodiments;

DETAILED DESCRIPTION

Figure 1:
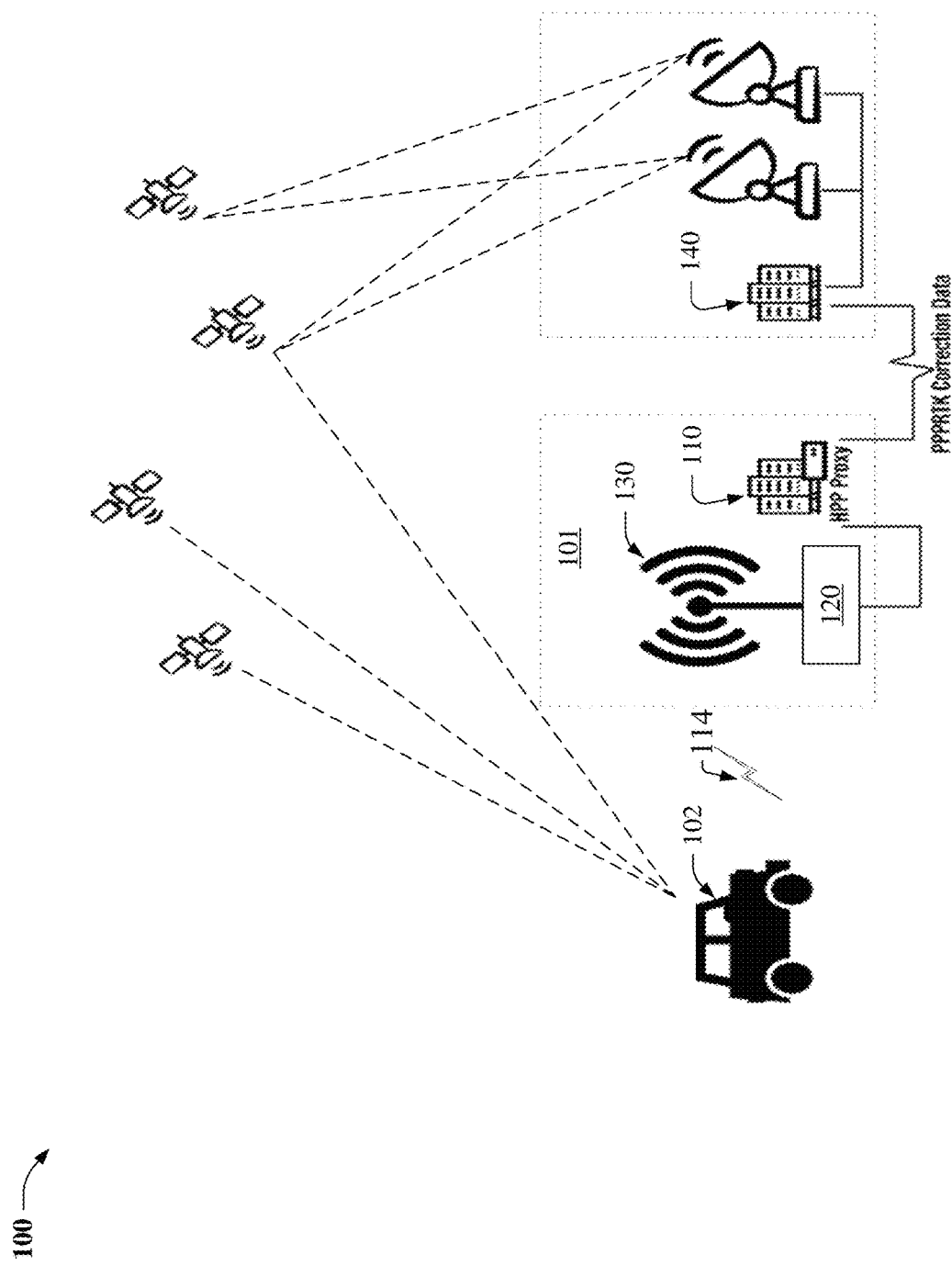
FIG. 1 illustrates a block diagram of a wireless network that facilitates a selective location-agnostic broadcast of corrective vehicle positioning information using an HPP proxy component, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional vehicle technologies have had some drawbacks with respect to controlling a position of a vehicle, autonomous vehicle, etc. due to lack of accurate, timely, etc. vehicle positioning information. Further, poor road conditions, fading of lane markings, adverse weather conditions, etc. can impede the ability of sensors of such technologies to control the position of a vehicle, and reliance of redundant sensors to overcome potential sensor failures increases vehicle cost. Various embodiments disclosed herein can improve control, navigation, etc. of a vehicle, autonomous vehicle, etc. by utilizing an HPP proxy component to broadcast location dependent satellite correction data to the vehicle.

For example, in embodiment(s), a system comprises an HPP proxy component that obtains satellite navigation correction data that is applicable to correct satellite navigation data, e.g., global navigation satellite system (GNSS) data. In turn, the HPP proxy component assigns respective portions of the satellite navigation correction data to defined geographical regions to facilitate respective point-to-multipoint wireless broadcasts, within the defined geographical regions, of such assigned satellite navigation correction data to respective vehicles that have been determined to be located within the defined geographical regions.

In this regard, the system comprises a cell broadcast center (CBC) component that receives, via a signaling plane, broadcast requests comprising the respective portions of the satellite navigation correction data from the HPP proxy component, and distributes the broadcast requests to respective wireless access point (AP) devices, e.g., eNodeBs (eNBs), fifth generation (5G) new radio (NR) access point devices (gNodeBs (gNBs)), etc. that are located within the defined geographical regions to facilitate the respective point-to-multipoint wireless broadcasts, via the respective wireless AP devices within the defined geographical regions, of the respective portions of the satellite navigation correction data to the respective vehicles that have been determined to be located within the defined geographical regions—the satellite navigation correction data facilitating correction of respective portions of the satellite navigation data, e.g., GNSS data, that have been received by the respective vehicles.

In an embodiment, the HPP proxy component defines the defined geographical regions based on a city boundary, a county boundary, a state boundary, a defined polygon (e.g., circle), or using one or more Federal Information Processing Standard (FIPS) code boundaries.

In another embodiment, the HPP proxy component sends respective satellite navigation correction data requests to satellite navigation correction data service(s), device(s), etc., and based on such requests, receives, via respective messages based on one or more protocols, e.g., a networked transport of radio technical commission for maritime services via Internet protocol (NTRIP), the satellite navigation correction data from the satellite navigation correction data service(s), device(s), etc.

In yet another embodiment, the HPP proxy component periodically receives, obtains, etc., based on a defined sampling, request, etc. period, the satellite navigation correction data from the satellite navigation correction data service(s), device(s), etc., e.g., receiving 1 message every defined M seconds.

In turn, in embodiment(s), the HPP proxy component periodically sends, e.g., via the signaling plane based on a defined transmission period, the broadcast requests (e.g., comprising respective system information block (SIB) type 12 messages comprising the respective portions of the satellite navigation correction data) to the CBC component, e.g., sending 1 broadcast request every defined N seconds (e.g., N being based on twice the defined sampling period).

In other embodiment(s), the HPP proxy component compresses, encodes, and/or encrypts the respective portions of the satellite navigation correction data to obtain processed data; and periodically sends, via the signaling plane, the processed data to the CBC component based on the defined transmission period.

In yet other embodiment(s), the CBC component distributes the broadcast requests, e.g., using public warning system (PWS) based messages, to the respective wireless AP devices via a mobility management entity (MME) corresponding to a long-term evolution (LTE) network, and/or a core access and mobility management function (AMF) corresponding to a 5G network.

In this regard, in embodiment(s), the PWS based messages comprise information representing a defined geographical region of the defined geographical regions, e.g., corresponding to a vehicle of the respective vehicles that has been determined to be located within the defined geographical region, and a portion of the respective portions of the satellite navigation correction data that has been assigned to the defined geographical region—to facilitate a point-to-multipoint wireless broadcast—of the respective point-to-multipoint wireless broadcasts—of the portion of the respective portions of the satellite navigation correction data to the vehicle within the defined geographical region.

In other embodiment(s), the HPP proxy component comprises a satellite navigation correction data broadcast enablement component that can activate, enable, etc. access of the fee-based satellite navigation correction data broadcast service "on demand", and otherwise disable such access when a request, demand, etc. for the fee-based satellite navigation service has not been detected.

For example, in one embodiment, the satellite navigation correction data broadcast enablement component can, in response to a request to access a fee-based satellite navigation correction data broadcast service within the defined geographical region being determined not to have been received from a vehicle of the respective vehicles that has been authorized to access at least one of various fee-based satellite navigation correction data broadcast services, disable, within the defined geographical region, point-to-multipoint wireless broadcasts of the respective point-to-multipoint wireless broadcasts.

Further, the satellite navigation correction data broadcast enablement component can, in response to a request to access the fee-based satellite navigation correction data broadcast service being determined to have been received from a vehicle of the respective vehicles, determine, e.g., via an authentication mechanism that queries a home subscriber server (HSS) of a corresponding wireless network, whether the vehicle is associated with an active subscription to the fee-based satellite navigation correction data broadcast service.

In this regard, in response to the vehicle being determined to be associated with the active subscription to the fee-based satellite navigation correction data broadcast service, the HPP proxy component can select, e.g., via one or more queries that are directed to the HSS and/or an MME corresponding to an LTE network, via one or more queries that are directed to an AMF of a 5G network, etc., a defined geographical region of the defined geographical regions comprising a coarse, rough, etc. location of the vehicle, e.g., comprising a cell sector that a wireless device of a vehicle system of the vehicle has been determined to be camped on, e.g., the cell sector being communicatively coupled, e.g., via paging, to the wireless device of the vehicle system. Further, the HPP proxy component can determine, obtain, etc. the portion of the satellite navigation correction data that has been assigned to the defined geographical region.

In turn, the HPP proxy component can send, via the signaling plane, a broadcast request of the broadcast requests comprising the defined geographical region and the portion of the satellite navigation correction data that has been assigned to the defined geographical region to the CBC component to facilitate a point-to-multipoint wireless broadcast of the respective point-to-multipoint wireless broadcasts, within the defined geographical region, of the portion of the satellite navigation correction data to the vehicle.

In embodiment(s), the HPP proxy component can define the region where the satellite navigation correction data is to be broadcast using respective interfaces between the HPP proxy component and the MME corresponding to the LTE network, or between the HPP proxy component and the AMF corresponding to the 5G network.

In an embodiment, a method comprises: determining, by a system comprising a processor, defined geographical regions representing distinct wireless broadcast areas; in response to receiving satellite navigation correction data, assigning, by the system, respective portions of the satellite navigation correction data to the defined geographical regions to facilitate respective point-to-multipoint wireless broadcasts, from the defined geographical regions, of the respective portions of the satellite navigation correction data to respective vehicles that have been determined to be camped on respective cell sectors within the defined geographical regions; and broadcasting, by the system via the respective point-to-multipoint wireless broadcasts, the respective portions of the satellite navigation correction data to the respective vehicles that have been determined to be camped on respective cell sectors within the defined geographical regions to facilitate respective corrections, using the respective portions of the satellite navigation correction data, of satellite navigation data that has been received by the respective vehicles.

In another embodiment, the broadcasting comprises distributing, by the system via respective control channels, broadcast requests comprising the respective portions of the satellite navigation correction data to respective CBC devices of the system that are communicatively coupled to respective wireless AP devices of the system—the respective wireless AP devices being wirelessly coupled to the respective vehicles within the defined geographical regions.

In yet another embodiment, the distributing comprises distributing SIB messages comprising the respective portions of the satellite navigation correction data to an MME corresponding to an LTE network, and/or a core AMF corresponding to a 5G network.

In an embodiment, the method further comprises: in response to receiving, from a vehicle of the respective vehicles, a request to access a fee-based satellite navigation correction data broadcast service corresponding to the respective point-to-multipoint wireless broadcasts, determining whether the vehicle is authorized to access the fee-based satellite navigation correction data broadcast service.

In turn, the method further comprises: in response to the vehicle being determined to be authorized to access the fee-based satellite navigation correction data broadcast service, selecting a defined geographical region of the defined geographical regions comprising a location of the vehicle, e.g., the location comprising a cell sector that a wireless device of a vehicle system of the vehicle has been determined to be camped on, e.g., the cell sector being communicatively coupled, via paging, to the wireless device of the vehicle system, obtaining a regional portion of the respective portions of the satellite navigation correction data that has been assigned to the defined geographical region, and sending, via a control channel, a broadcast request of the broadcast requests comprising information representing the defined geographical area and the regional portion of the respective portions of the satellite navigation correction data to a CBC device of the system—the broadcasting comprising broadcasting, from the defined geographical region via a point-to-multipoint wireless broadcast of the respective point-to-multipoint wireless broadcasts, the regional portion of the respective portions of the satellite navigation correction data to the vehicle to facilitate a correction of the respective corrections of a portion of the satellite navigation data that has been received by the vehicle.

In one embodiment, a machine-readable storage medium comprises executable instructions that, when executed by a processor, facilitate performance of operations, comprising: obtaining satellite navigation correction data usable to facilitate a correction of satellite navigation data of a satellite navigation; assigning respective portions of the satellite navigation correction data to defined geographical areas to facilitate broadcasts of the respective portions of the satellite navigation correction data from the defined geographical areas to respective vehicles within the defined geographical areas.

In turn, the operations further comprise: in response to receiving a satellite navigation correction data request from a vehicle of the respective vehicles, and in response to the vehicle being determined to be authorized to receive the satellite navigation correction data, selecting a defined geographical area of the defined geographical areas that comprises a location of the vehicle (e.g., the defined geographical area comprising a cell sector that a wireless device of a vehicle system of the vehicle has been determined to be camped on, e.g., the cell sector being communicatively coupled, e.g., via paging, to the wireless device of the vehicle system), and sending, via a signaling channel, an SIB message comprising information representing the defined geographical area and a first portion of the respective portions of the satellite navigation correction data that has been assigned to the defined geographical area to a CBC device—the CBC device is to further send the SIB message to a wireless AP device, e.g., eNodeB (eNB), gNodeB (gNB), etc. that is located within the defined geographical area, and the wireless AP device is to further transmit a point-to-multipoint broadcast comprising the SIB message to the vehicle to facilitate the correction, based on the first portion of the respective portions of the satellite navigation correction data, of a second portion of the satellite navigation data that has been received by the vehicle.

In another embodiment, the operations further comprise: in response to a request to access a fee-based satellite navigation correction data broadcast service within the defined geographical area being determined not to have been received from the vehicle that has been authorized to access the fee-based satellite navigation correction data broadcast service, disabling at least some of the broadcasts within the defined geographical area.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As mentioned above, conventional vehicle technologies have had some drawbacks with respect to controlling a position of a vehicle, autonomous vehicle, etc. due to lack of accurate, timely, etc. vehicle positioning information. Further, poor road conditions, fading of lane markings, adverse weather conditions, etc. can impede the ability of sensors of such technologies to control the position of a vehicle, and reliance of redundant sensors to overcome potential sensor failures increases vehicle cost. To address these and other concerns of such technologies, various embodiments disclosed herein can improve control, navigation, etc. of a vehicle by utilizing an HPP proxy component to broadcast location dependent satellite correction data to the vehicle.

Figure 2:
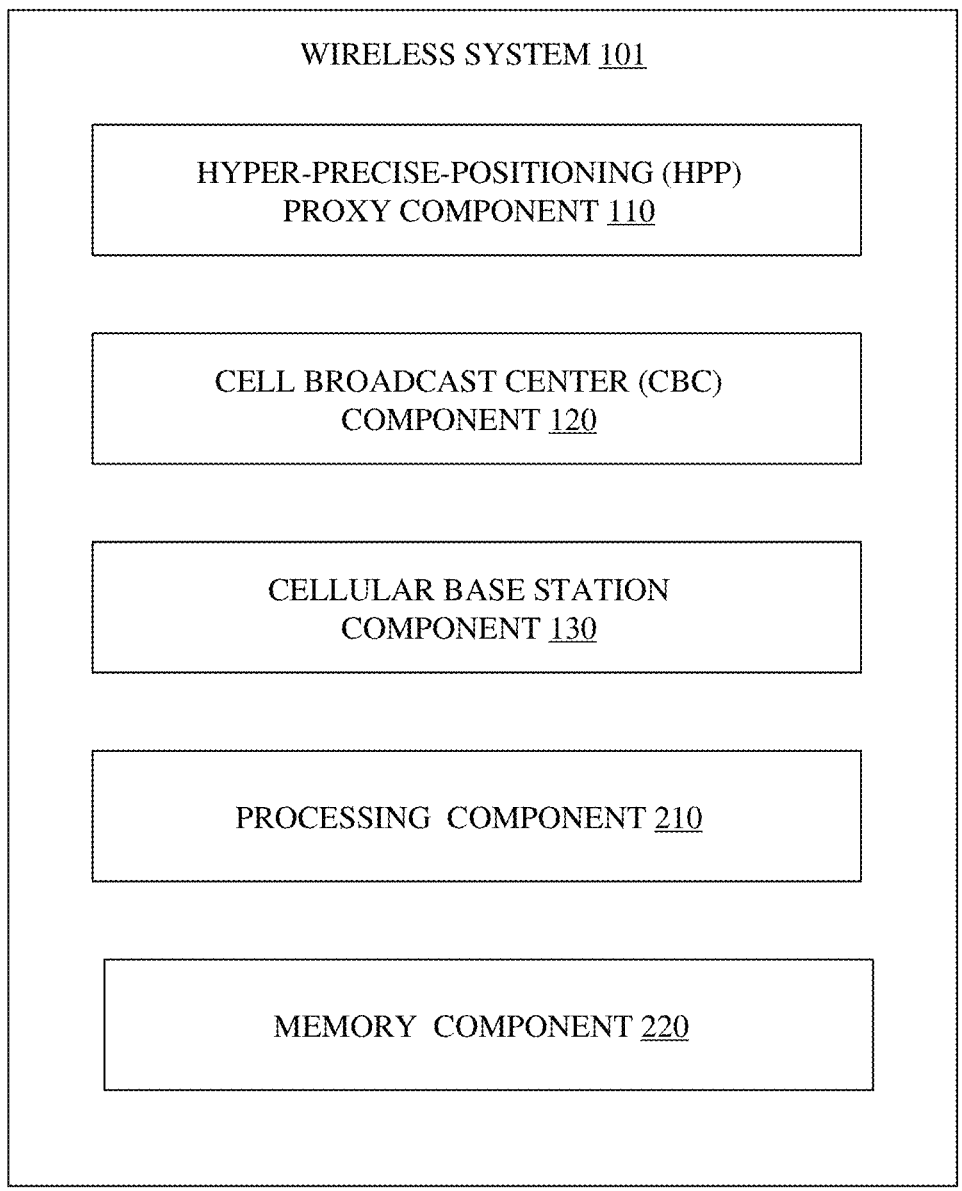
FIG. 2 illustrates a block diagram of a wireless system that facilitates selective location-agnostic broadcast of corrective vehicle positioning information using an HPP proxy component, in accordance with various example embodiments.
Figure 3:
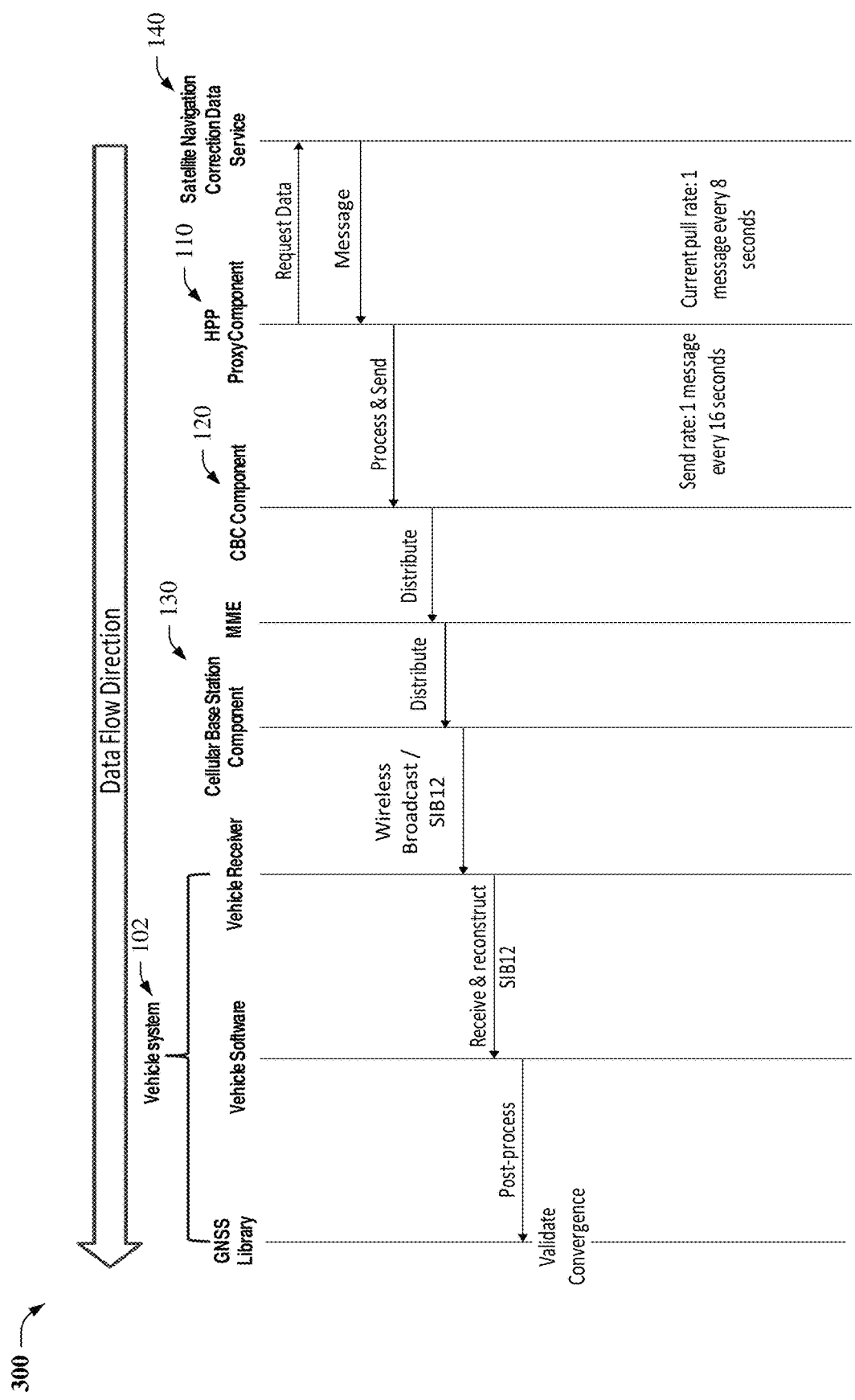
FIG. 3 illustrates a block diagram of a data flow of a selective location-agnostic broadcast of corrective vehicle positioning information using an HPP proxy component, in accordance with various example embodiments.

In this regard, and now referring to FIGS. 1-3, block diagrams of a wireless network (100) that facilitates a selective location-agnostic broadcast of corrective vehicle positioning information using an HPP proxy component (110), a wireless system (101) that facilitates selective location-agnostic broadcast of corrective vehicle positioning information using an HPP proxy component, and a data flow (300) of a selective location-agnostic broadcast of corrective vehicle positioning information using the HPP proxy component are illustrated, respectively, in accordance with various example embodiments.

In this regard, the HPP proxy component can define geographical regions, defined geographical regions, etc. from which, as described below, satellite navigation correction data that has been assigned to the defined geographical regions will be broadcast to vehicles that have been determined to be located within the defined geographical regions—to facilitate location dependent broadcast of the satellite correction data to such vehicles. In this regard, in embodiment(s), the HPP proxy component can define the geographical regions, defined geographical regions, etc. based on a city boundary, a county boundary, a state boundary, a defined polygon (e.g., circle), or using one or more FIPS code boundaries.

In turn, the HPP proxy component can obtain the satellite navigation correction data (e.g., precise point positioning (PPP) real-time kinematic (RTK) data) from a satellite navigation correction data service (140). In embodiment(s), the satellite navigation correction data service can obtain such data via a distributed network of respective location error reference stations corresponding to each geographical region of the defined geographical regions.

In this regard, in one embodiment, the HPP proxy component can request data for a defined geographical region—sending a satellite navigation correction data regional request to the satellite navigation correction data service to obtain satellite navigation correction data for the defined geographical region.

In another embodiment, the HPP proxy component can request a bulk data set of satellite navigation correction data representing satellite navigation correction data for a group of geographical regions comprising the defined geographical region—sending a satellite navigation correction data bulk request to the satellite navigation correction data service to obtain a bulk data set of satellite navigation correction data for the group of geographical regions. In turn, the HPP proxy component can select, extract, obtain, etc. the satellite navigation correction data for the defined geographical region from the bulk data set.

Further, based on such requests, the HPP proxy component can receive, via respective messages, the satellite navigation correction data for the defined geographical region, the bulk data set of satellite navigation correction data for the group of geographical regions, etc. from the satellite navigation correction data service. For example, in one embodiment, the HPP proxy component can periodically receive, based on a defined sampling, request, etc. period (e.g., receiving 1 message every defined M seconds), the satellite navigation correction data, the bulk data set of satellite navigation correction data, etc. from the satellite navigation correction data service.

In turn, the HPP proxy component can assign, map, etc. respective portions of the satellite navigation correction data to the defined geographical regions to facilitate respective point-to-multipoint wireless broadcasts, within the defined geographical regions, of the respective portions of the satellite navigation correction data to respective vehicles that have been determined to be located within the defined geographical regions.

Further, the HPP proxy component can periodically send, via a signaling plane, control plane, signal plane, etc. (see, e.g., 410 of FIG. 4) based on a defined transmission period (e.g., sending 1 broadcast request every defined N seconds (e.g., N being based on twice the defined sampling, request, etc. period)), the broadcast requests comprising the respective portions of the satellite navigation correction data to a CBC component (120). In this regard, the signaling plane, control plane, signal plane, etc. is part of a network, communication network, etc. (e.g., wireless network 100) that carries signaling traffic, e.g., control packets, and is responsible for routing such packets within the network, communication network, etc. The signaling traffic, control packets, etc. comprising system configuration and management information with respect to routing of data, data packets, etc. via a data plane (see, e.g., 420 of FIG. 4, e.g., a Uu interface of a gateway device (e.g., serving gateway (SGW), packet data network gateway (PGW)))—the data plane used to carry data packets to/from a user equipment, e.g., a cellular device, a vehicle (102), etc. that is communicatively coupled to the wireless network.

In embodiment(s), the HPP proxy component compresses, encodes, and/or encrypts the respective portions of the satellite navigation correction data to obtain processed data; and periodically sends, via the signaling plane, the processed data to the CBC component based on the defined transmission period.

In other embodiment(s), the broadcast requests, processed data, etc. can comprise respective SIB type 12 messages, e.g., used to communicate commercial mobile alert service (CMAS) information.

In turn, in response to receiving the broadcast requests, processed data, etc., the CBC component can distribute the broadcast requests, processed data, etc. to respective wireless AP devices, e.g., eNBs, gNBs, etc., of cellular base station component (130)—the AP devices being located within the defined geographical regions (not shown) to facilitate the respective point-to-multipoint wireless broadcasts (e.g., via cells (see, e.g., "Cell 1", "Cell 2", "Cell 3", etc. of FIG. 4) of the respective wireless AP devices that are located within the defined geographical regions) of the respective portions of the satellite navigation correction data to the respective vehicles that have been determined to be located within the defined geographical regions—the satellite navigation correction data facilitating correction of respective portions of satellite navigation data, e.g., GNSS data, that have been received by the respective vehicles.

In embodiment(s), the CBC component can distribute, e.g., using PWS based messages, the broadcast requests to the respective wireless AP devices via an MME corresponding to an LTE network. In other embodiment(s) (not shown), the CBC component can distribute the broadcast requests to the respective wireless AP devices, e.g., gNBs, via a core AMF corresponding to a 5G network.

In embodiment(s), the PWS based messages comprise information representing a defined geographical region of the defined geographical regions, e.g., corresponding to a vehicle (e.g., 102) of the respective vehicles that has been determined to be located within the defined geographical region, and a portion of the respective portions of the satellite navigation correction data that has been assigned to the defined geographical region—to facilitate a point-to-multipoint wireless broadcast of the respective point-to-multipoint wireless broadcasts of the portion of the satellite navigation correction data to the vehicle within the defined geographical region.

In other embodiment(s) illustrated by FIG. 5, the HPP proxy component comprises a satellite navigation correction data broadcast enablement component (510) that can activate, enable, etc. access of the fee-based satellite navigation correction data broadcast service "on demand", and otherwise disable such access when a request, demand, etc. for the fee-based satellite navigation service has not been detected, e.g., within a defined period of time. In this regard, in one embodiment, in response to a request to access a fee-based satellite navigation correction data broadcast service within a defined geographical region being determined not to have been received from a vehicle of the respective vehicles that has been authorized to access at least one of various fee-based satellite navigation correction data broadcast services, the satellite navigation correction data broadcast enablement component can disable, within the defined geographical region, point-to-multipoint wireless broadcasts of the respective point-to-multipoint wireless broadcasts, e.g., to conserve wireless communication resources of the wireless network.

In another embodiment, in response to a request to access the fee-based satellite navigation correction data broadcast service being determined to have been received from a vehicle (e.g., 102) of the respective vehicles, the satellite navigation correction data broadcast enablement component can determine, e.g., via an authentication mechanism that queries an HSS of a corresponding wireless system (e.g., 101), whether the vehicle is associated with an active subscription to the fee-based satellite navigation correction data broadcast service.

Figure 4:
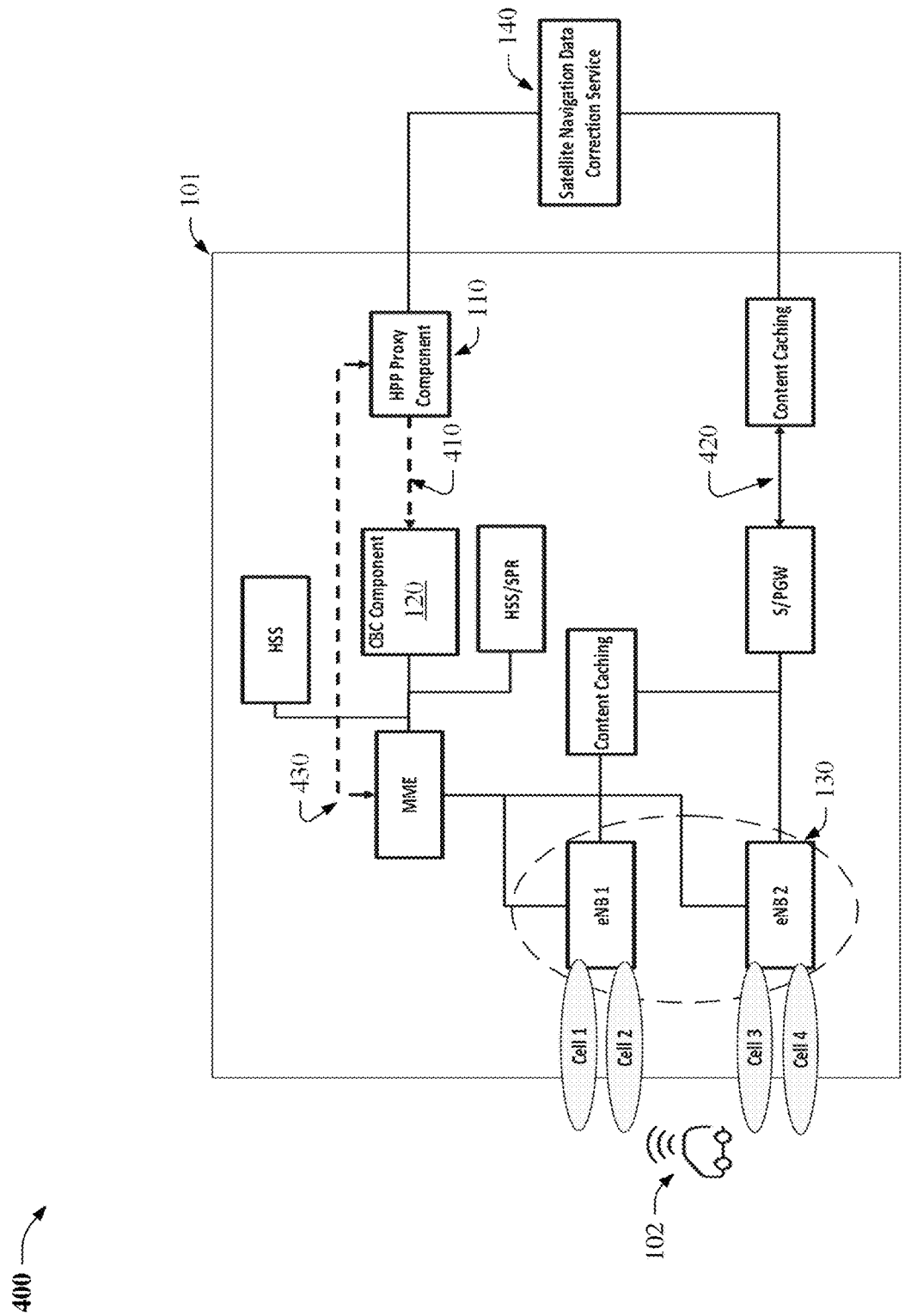
FIG. 4 illustrates a wireless network that facilitates a selective location-agnostic broadcast of corrective vehicle positioning information using an HPP proxy component, in accordance with various example embodiments.

In embodiment(s), in response to the vehicle being determined to be associated with the active subscription to the fee-based satellite navigation correction data broadcast service, a key, security key, etc. can be transferred, e.g., via the satellite navigation correction data broadcast enablement component, to the vehicle using a data plane, e.g., Uu interface (see, e.g., 420 of FIG. 4). As described below, such key, security key, etc. can be used by the vehicle to decode, utilize, etc. satellite navigation correction data contained within point-to-multipoint wireless broadcasts of the respective point-to-multipoint wireless broadcasts.

In this regard, in response to the vehicle being determined to be associated with the active subscription to the fee-based satellite navigation correction data broadcast service, the HPP proxy component can select, e.g., via one or more queries that are directed to the HSS and/or an MME corresponding to an LTE network, via one or more queries that are directed to an AMF of a 5G network, etc., a defined geographical region of the defined geographical regions comprising a coarse, rough, etc. location of the vehicle, e.g., comprising a cell sector that a wireless device of a vehicle system of the vehicle has been determined to be camped on, e.g., the cell sector being communicatively coupled, e.g., via paging, to the wireless device of the vehicle system. Further, the HPP proxy component can obtain the portion of the satellite navigation correction data that has been assigned to the defined geographical region.

In embodiment(s), the HPP proxy component can select the region where the satellite navigation correction data is to be broadcast using respective interfaces (e.g., 430) between the HPP proxy component and an MME corresponding to an LTE network, or between the HPP proxy component and an AMF (not shown) corresponding to a 5G network.

In turn, the HPP proxy component can send, via a signaling plane (e.g., 410) between the HPP proxy component and the CBC component, a broadcast request of the broadcast requests comprising the defined geographical region and the portion of the satellite navigation correction data that has been assigned to the defined geographical region to the CBC component to facilitate a point-to-multipoint wireless broadcast of the respective point-to-multipoint wireless broadcasts, within the defined geographical region, of the portion of the satellite navigation correction data to the vehicle.

In an embodiment, the broadcast request can further comprise the key, security key, etc. (see above) to enable the vehicle to decode, utilize, etc. the portion of the satellite navigation correction data that has been assigned to the defined geographical region, e.g., to facilitate a correction, e.g., via a system of the vehicle using the portion of the satellite navigation correction data, of GNSS data that has been received by the vehicle.

FIGS. 6-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
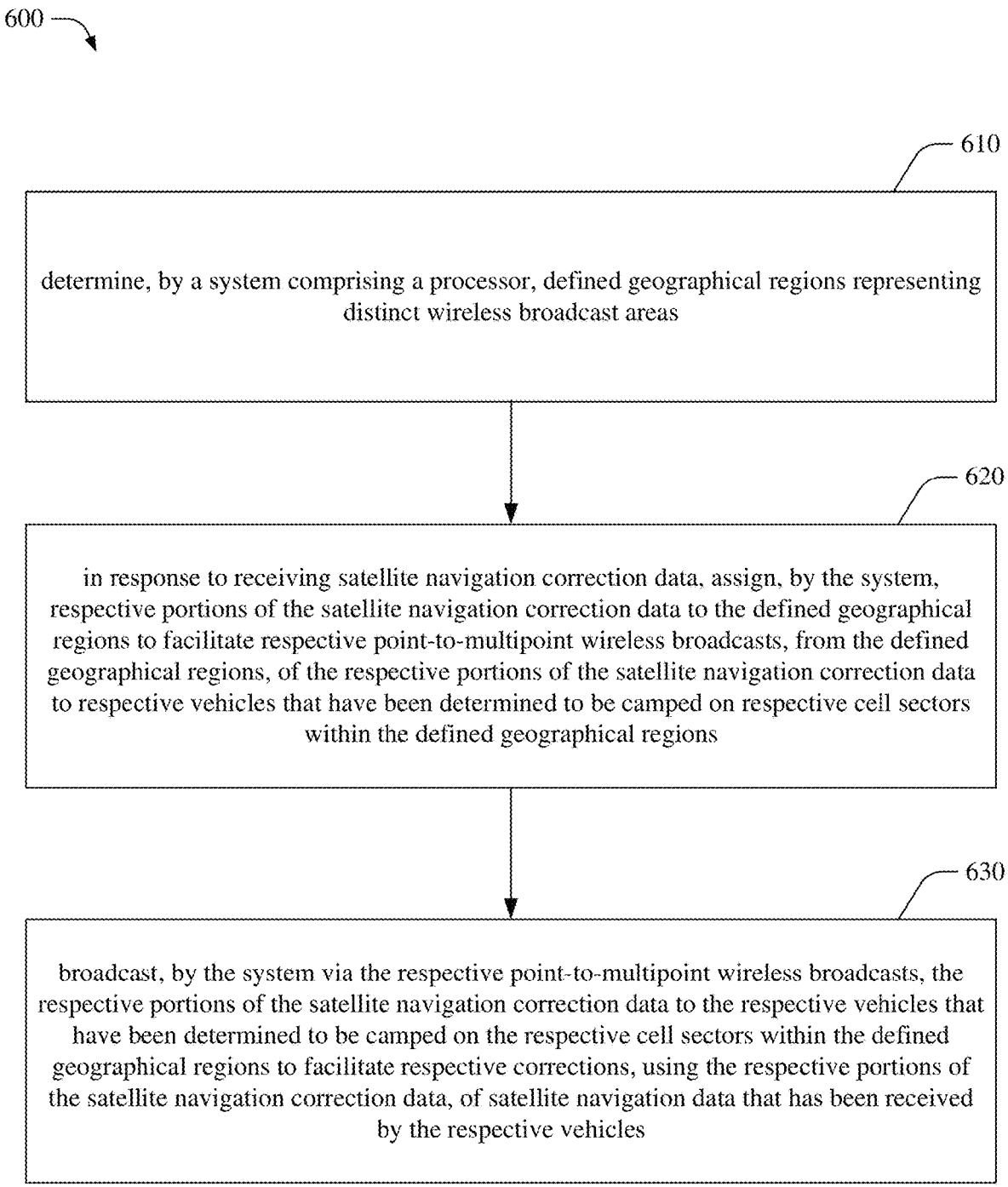
FIGS. 6-9 illustrate flowcharts of methods associated with selective location-agnostic broadcast of corrective vehicle positioning information using an HPP proxy component, in accordance with various example embodiments.

Referring now to FIG. 6, a method (600) associated with selective location-agnostic broadcast of corrective vehicle positioning information using an HPP proxy component is illustrated, in accordance with various example embodiments. At 610, a system (e.g., 101) comprising a processor, can determine defined geographical regions representing distinct wireless broadcast areas. At 620, in response to receiving satellite navigation correction data, the system can assign respective portions of the satellite navigation correction data to the defined geographical regions to facilitate respective point-to-multipoint wireless broadcasts, from the defined geographical regions, of the respective portions of the satellite navigation correction data to respective vehicles that have been determined to be camped on respective cell sectors within the defined geographical regions.

In turn, at 630, the system can broadcast, via the respective point-to-multipoint wireless broadcasts, the respective portions of the satellite navigation correction data to respective vehicles that have been determined to be camped on the respective cell sectors within the defined geographical regions to facilitate respective corrections, using the respective portions of the satellite navigation correction data, of satellite navigation data, e.g., GNSS data, that has been received by the respective vehicles.

Figure 7:
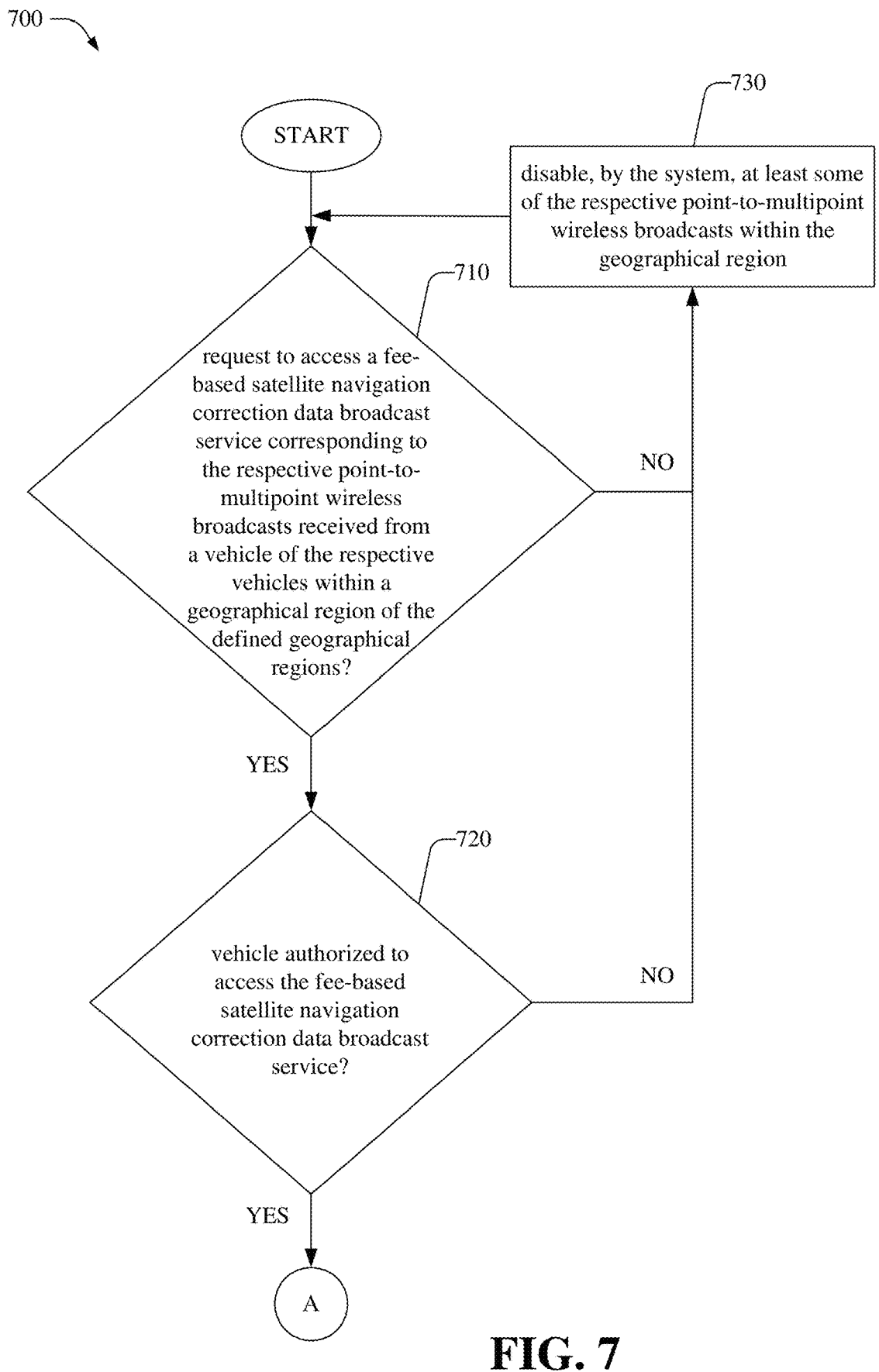
Figure 8:
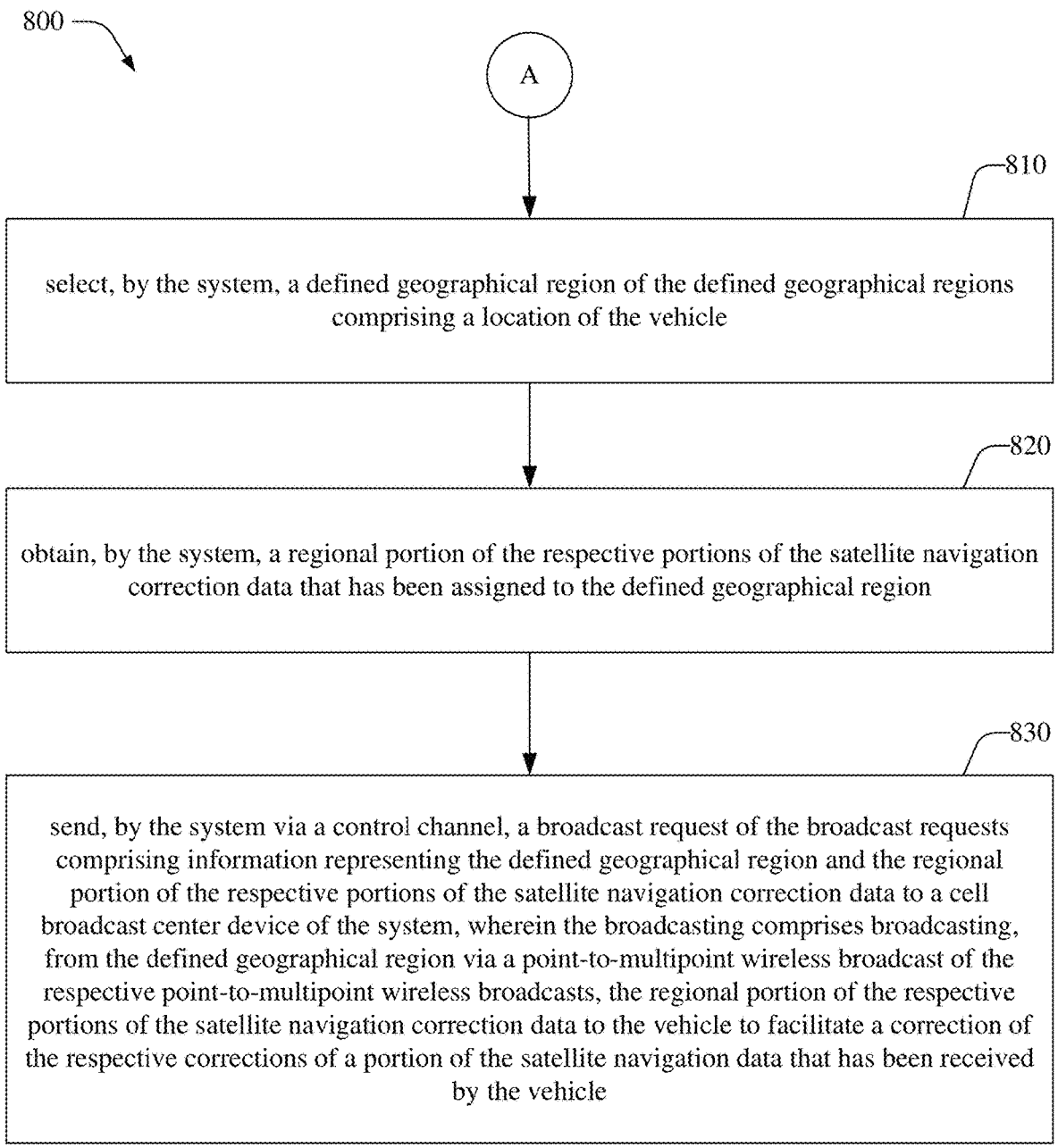

FIGS. 7-8 illustrate flowcharts of another method associated with selective location-agnostic broadcast of corrective vehicle positioning information using an HPP proxy component, in accordance with various example embodiments. At 710, it can be determined, by a system (e.g., 101), whether a request to access a fee-based satellite navigation correction data broadcast service corresponding to the respective point-to-multipoint wireless broadcasts has been received from a vehicle of the respective vehicles within a geographical region of the defined geographical regions.

In this regard, in response to a determination that the request to access the fee-based satellite navigation correction data broadcast service has been received from the vehicle, flow continues to 720, at which the system can determine, e.g., by querying an HSS of a corresponding wireless network, whether the vehicle is authorized to access the fee-based satellite navigation correction data broadcast service; otherwise flow continues to 730, at which the system can disable at least some of the respective point-to-multipoint wireless broadcasts within the geographical region.

At 720, in response to a determination that the vehicle is authorized to access the fee-based satellite navigation correction data broadcast service, flow continues to 810; otherwise flow continues to 730.

At 810, the system can select, e.g., via an interface (see, e.g., 430) between the HPP proxy component and an MME, AMF, etc., a defined geographical region of the defined geographical regions that comprises a location, coarse location, etc. of the vehicle, e.g., comprising a cell sector that a wireless device of a vehicle system of the vehicle has been determined to be camped on, e.g., the cell sector being communicatively coupled, e.g., via paging, to the wireless device of the vehicle system. At 820, the system can obtain a regional portion of the respective portions of the satellite navigation correction data that has been assigned to the defined geographical region.

In turn, at 830, the system can send, via a control channel, signaling channel, etc., a broadcast request of the broadcast requests comprising information representing the defined geographical region and the regional portion of the respective portions of the satellite navigation correction data to a CBC device (e.g., 120) of the system. In this regard, the broadcasting comprises broadcasting, from the defined geographical region via a point-to-multipoint wireless broadcast of the respective point-to-multipoint wireless broadcasts, the regional portion of the respective portions of the satellite navigation correction data to the vehicle to facilitate a correction of the respective corrections of a portion of the satellite navigation data, e.g., GNSS data, that has been received by the vehicle.

Figure 9:
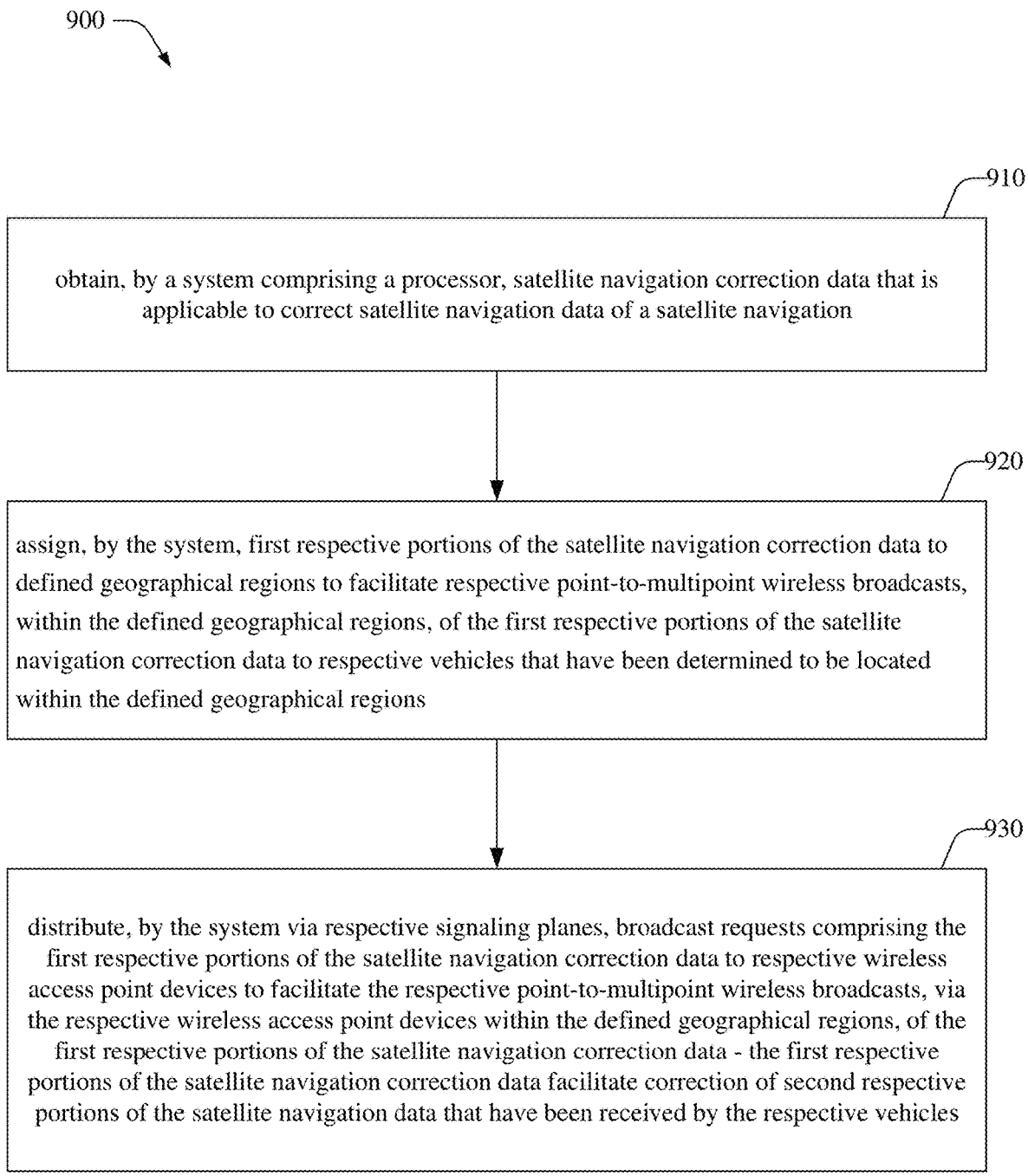

Referring now to FIG. 9, yet another method (900) associated with selective location-agnostic broadcast of corrective vehicle positioning information using an HPP proxy component is illustrated, in accordance with various example embodiments. At 910, a system (e.g., 101), can obtain satellite navigation correction data that is applicable to correct satellite navigation data of a satellite navigation. At 920, the system can assign first respective portions of the satellite navigation correction data to defined geographical regions to facilitate respective point-to-multipoint wireless broadcasts, within the defined geographical regions, of the first respective portions of the satellite navigation correction data to respective vehicles that have been determined to be located within the defined geographical regions.

At 930, the system can distribute, via respective signaling, control, etc. planes, broadcast requests comprising the first respective portions of the satellite navigation correction data to respective wireless access point devices to facilitate the respective point-to-multipoint wireless broadcasts, via the respective wireless access point devices within the defined geographical regions, of the first respective portions of the satellite navigation correction data—the first respective portions of the satellite navigation correction data facilitate correction of second respective portions of the satellite navigation data that have been received by the respective vehicles.

Figure 10:
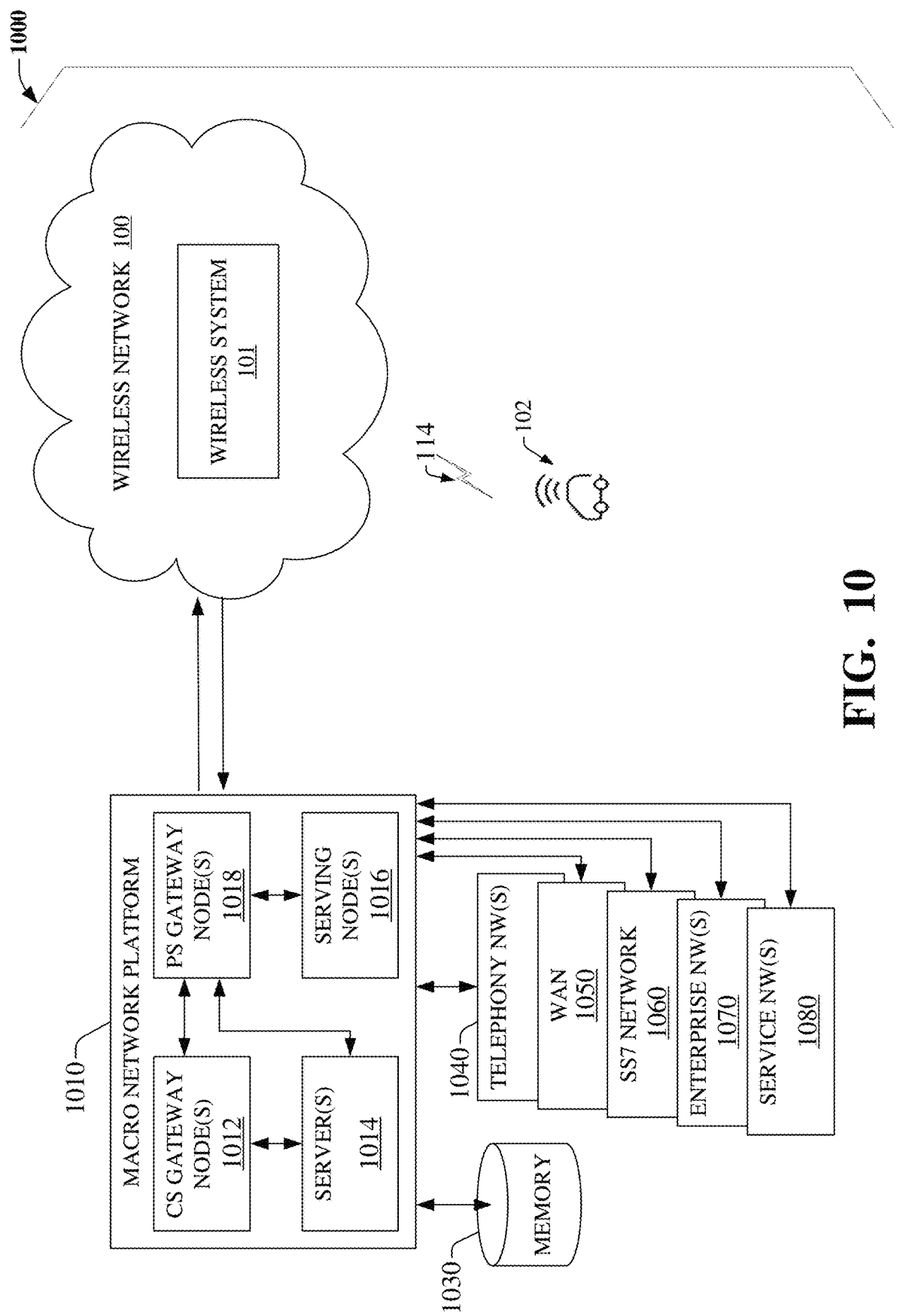
FIG. 10 illustrates a block diagram of a wireless network environment, in accordance various example embodiments.

With respect to FIG. 10, a wireless communication environment 1000 including macro network platform 1010 is illustrated, in accordance with various embodiments. Macro network platform 1010 serves or facilitates communication with a vehicle system (not shown) of a vehicle, an autonomous vehicle, etc. (e.g., 102) via wireless network 100. It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, 5G, etc. that can be associated with wireless network 100, macro network platform 1010 can be embodied in a core network. It is noted that wireless network 100 can include base station(s), base transceiver station(s), access point(s), etc. (e.g., eNBs, gNBs, etc.) and associated electronic circuitry and deployment site(s), in addition to a wireless radio link (e.g., 114) operated in accordance with the base station(s), etc. Accordingly, wireless network 100 can comprise various coverage cells, or wireless coverage areas. In addition, it should be appreciated that elements and/or components, e.g., of wireless system 101, can be located/included within one or more components/elements, e.g., hardware, software, etc., of wireless communication environment 1000, e.g., macro network platform 1010, wireless network 100, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via HPP proxy component 110. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signaling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via wireless network 100, with served devices, communication devices, etc. Such data sessions can include traffic exchange with networks external to macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of a vehicle, an autonomous vehicle, etc. (e.g., 102), HPP proxy component 110, etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via wireless network 100; and so forth. Memory 1030 can also store information from at least one of telephony network(s) 1040, WAN 1050, SS7 network 1060, enterprise NW(s) 1070, or service NW(s) 1080.

In one or more embodiments, components of core network environment 1000 can provide communication services to the vehicle, the autonomous vehicle, etc. utilizing an over-the-air wireless link (e.g., 114) via wireless network 100. In this regard, wireless network 100 can include one or more: macro, Femto, or pico access points (APs) (not shown); base stations (BS) (not shown); landline networks (e.g., optical landline networks, electrical landline networks) (not shown) communicatively coupled between the autonomous vehicle and macro network platform 1010, etc.

Core network environment 1000 can include one or more of the Internet (or another communication network (e.g., IP-based network)), or DSL-type or broadband network facilitated by Ethernet or other technology. In various embodiments, core network environment 1000 can include hardware and/or software for allocating resources to the vehicle, autonomous vehicle, etc. and wireless system 101, converting or enforcing protocols, establishing and/or providing levels of quality of service (QoS), providing applications or services, translating signals, and/or performing other desired functions to facilitate system interoperability and communication to/from the vehicle, autonomous vehicle, etc. and wireless system 101.

In other embodiment(s), core network environment 1000 can include data store component(s), a memory configured to store information, computer-readable storage media storing computer-executable instructions, e.g., memory component 220, memory 1030, etc. enabling various operations performed via wireless system as described herein.

As it employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "middleware," "memory storage," "memory component", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory component 220, memory 1030, system memory 1106 (see below), external storage 1116 (see below), and/or memory storage 1152 (see below). Further, nonvolatile memory can be included in read only memory (ROM), programmable ROM (PROM), electrically programmable ROM (EPROM), electrically erasable ROM (EEPROM), or flash memory. Volatile memory 1020 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
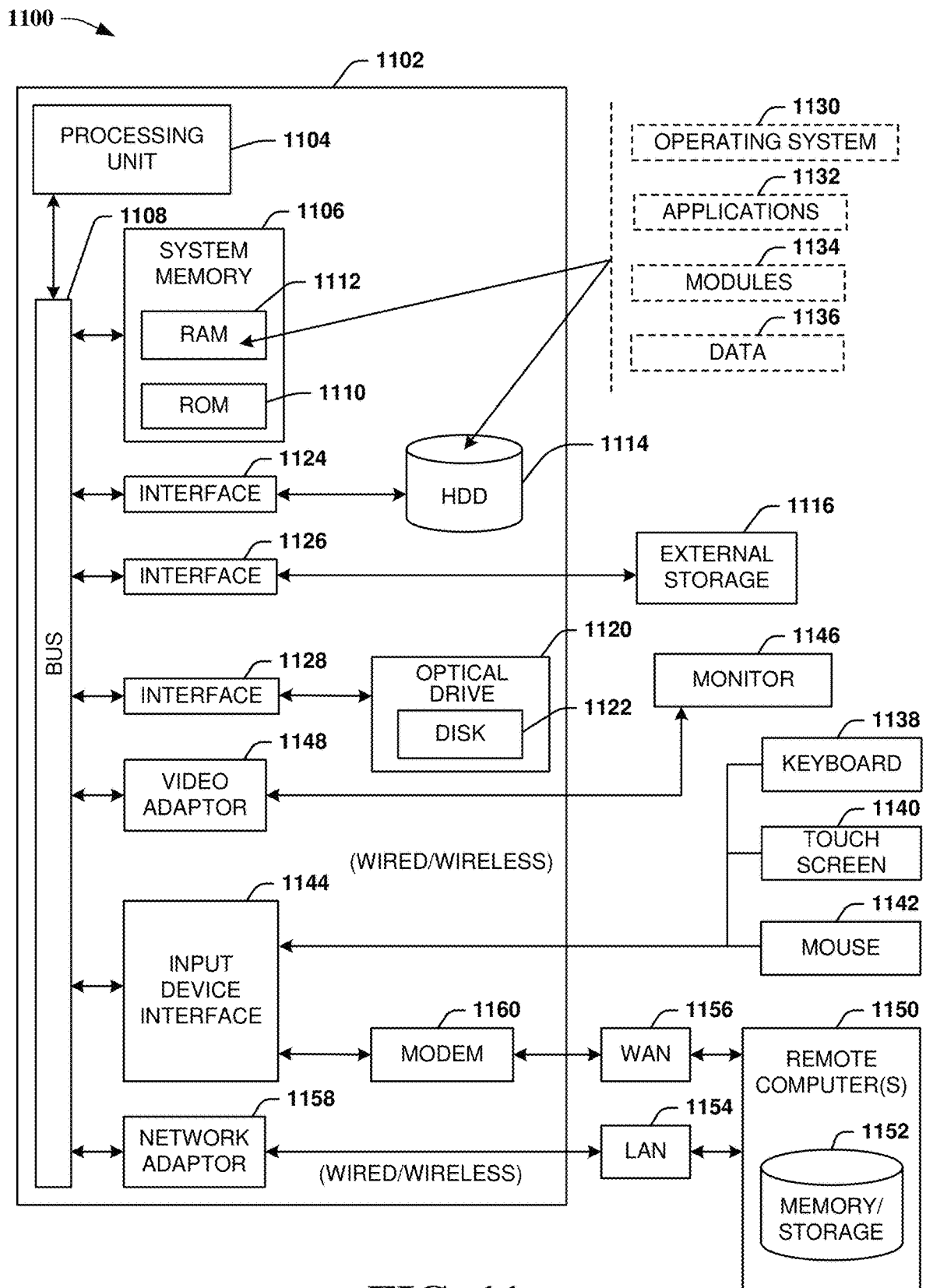
FIG. 11 is a block diagram representing an illustrative non-limiting computing system or operating environment in which one or more aspects of various embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a wireless system (see e.g., 101), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, vehicle system, vehicle, autonomous vehicle, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., wireless system 101), including but not limited to: in response to determining that a request to access a fee-based satellite navigation correction data broadcast service has been received from a vehicle of the respective vehicles, determining whether the vehicle is associated with an active subscription to the fee-based satellite navigation correction data broadcast service.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations by the processor, comprising:
        obtaining satellite navigation correction data that is applicable to correct satellite navigation data;
        assigning first respective portions of the satellite navigation correction data to defined geographical regions to facilitate respective point-to-multipoint wireless broadcasts, within the defined geographical regions, of the first respective portions of the satellite navigation correction data to respective vehicles that have been determined to be located within the defined geographical regions;
        distributing, via respective signaling planes, broadcast requests comprising the first respective portions of the satellite navigation correction data to respective wireless access point devices to facilitate the respective point-to-multipoint wireless broadcasts, via the respective wireless access point devices within the defined geographical regions, of the first respective portions of the satellite navigation correction data, wherein the first respective portions of the satellite navigation correction data facilitate correction of second respective portions of the satellite navigation data that have been received by the respective vehicles; and in response to determining, via wireless paging between a device of a cell sector and a wireless device of a vehicle of the respective vehicles, that the vehicle is communicatively coupled to the device of the cell sector within a defined geographical region of the defined geographical regions, obtaining a regional portion of the first respective portions of the satellite navigation correction data that is applicable to correct a received portion of the second respective portions of the satellite navigation data that has been received by the vehicle.

2. The system of claim 1, wherein the obtaining comprises:
in response to sending respective satellite navigation correction data requests to a satellite navigation correction data service device, receiving the satellite navigation correction data from the satellite navigation correction data service device.

3. The system of claim 2, wherein the receiving comprises:
based on a defined sampling period, periodically receiving the satellite navigation correction data from the satellite navigation correction data service device.

4. The system of claim 3, wherein the distributing comprises:
based on a defined transmission period, periodically sending, via the respective signaling planes, the broadcast requests directed to the respective wireless access point devices.

5. The system of claim 4, wherein the periodically sending comprises:
periodically sending, via the respective signaling planes using respective system information block type 12 messages, the broadcast requests directed to the respective wireless access point devices.

6. The system of claim 4, wherein the periodically sending comprises:
at least one of compressing, encoding, or encrypting the first respective portions of the satellite navigation correction data to obtain processed data; and
periodically sending, via the respective signaling planes, the processed data directed to the respective wireless access point devices.

7. The system of claim 1, wherein the distributing comprises:
distributing the broadcast requests to the respective wireless access point devices via at least one of a mobility management entity corresponding to a long-term evolution network, or a core access and mobility management function corresponding to a fifth generation network.

8. The system of claim 1, wherein a broadcast request of the broadcast requests comprises a cell broadcast message comprising information representing the defined geographical region and the regional portion of the first respective portions of the satellite navigation correction data to facilitate a point-to-multipoint wireless broadcast of the respective point-to-multipoint wireless broadcasts of the regional portion of the first respective portions of the satellite navigation correction data to the vehicle.

9. The system of claim 1, wherein the operations further comprise:
in response to determining that a request to access a fee-based satellite navigation correction data broadcast service has been received from the vehicle, determining whether the vehicle is associated with an active subscription to the fee-based satellite navigation correction data broadcast service.

10. The system of claim 9, wherein obtaining the regional portion of the first respective portions of the satellite navigation correction data further comprises:
in response to the vehicle being determined to be associated with the active subscription to the fee-based satellite navigation correction data broadcast service,
obtaining the regional portion of the first respective portions of the satellite navigation correction data; and
sending, via a signaling plane of the respective signaling planes, a broadcast request of the broadcast requests comprising the defined geographical region and the regional portion of the first respective portions of the satellite navigation correction data that has been assigned to the defined geographical region to a cell broadcast center device to facilitate a point-to-multipoint wireless broadcast of the respective point-to-multipoint wireless broadcasts, within the defined geographical region, of the regional portion of the first respective portions of the satellite navigation correction data to the vehicle.

11. The system of claim 10, wherein the operations further comprise:
selecting the defined geographical region of the defined geographical regions via a mobility management entity corresponding to a long-term evolution network or a core access and mobility management function corresponding to a fifth generation network.

12. The system of claim 1, wherein the vehicle is a first vehicle, and wherein the operations further comprise:
in response to a request to access a fee-based satellite navigation correction data broadcast service within the defined geographical region being determined not to have been received from a second vehicle of a group of vehicles that has been authorized to access the fee-based satellite navigation correction data broadcast service, disabling, within the defined geographical region, point-to-multipoint wireless broadcasts of the respective point-to-multipoint wireless broadcasts.

13. The system of claim 1, wherein the operations further comprise:
defining the defined geographical region based on a boundary of a group of boundaries, the group of boundaries comprising a city boundary, a county boundary, a state boundary, a defined polygon, or a federal information processing standard code boundary.

14. A method, comprising:
determining, by a system comprising a processor, defined geographical regions representing distinct wireless broadcast areas;
in response to receiving satellite navigation correction data, assigning, by the system, respective portions of the satellite navigation correction data to the defined geographical regions to facilitate respective point-to-multipoint wireless broadcasts, from the defined geographical regions, of the respective portions of the satellite navigation correction data to respective vehicles that have been determined to be camped on respective cell sectors within the defined geographical regions;
broadcasting, by the system via the respective point-to-multipoint wireless broadcasts, the respective portions of the satellite navigation correction data to the respective vehicles that have been determined to be camped on the respective cell sectors within the defined geographical regions to facilitate respective corrections, using the respective portions of the satellite navigation correction data, of satellite navigation data that has been received by the respective vehicles; and based on wireless paging between a vehicle device of a vehicle of the respective vehicles and a device of a cell sector, of the respective cell sectors, that is located within a defined geographical region of the defined geographical regions, determining that the vehicle is camped within the defined geographical region, and obtaining a regional portion, of the respective portions of the satellite navigation correction data, that has been assigned to the defined geographical region to facilitate a correction of the respective corrections of the satellite navigation data corresponding to the vehicle.

15. The method of claim 14, wherein the broadcasting comprises:

distributing, by the system via respective control channels, broadcast requests comprising the respective portions of the satellite navigation correction data to respective cell broadcast center devices of the system that are communicatively coupled to respective wireless access point devices of the system, the respective wireless access point devices being wirelessly coupled to the respective vehicles within the defined geographical regions.

16. The method of claim 15, wherein the distributing comprises:

distributing system information block messages comprising the respective portions of the satellite navigation correction data to at least one of a mobility management entity corresponding to a long-term evolution network, or a core access and mobility management function corresponding to a fifth generation network.

17. The method of claim 14, further comprising:

in response to receiving, from the vehicle, a request to access a fee-based satellite navigation correction data broadcast service corresponding to the respective point-to-multipoint wireless broadcasts, determining whether the vehicle is authorized to access the fee-based satellite navigation correction data broadcast service.

18. The method of claim 17, further comprising:

in response to the vehicle being determined to be authorized to access the fee-based satellite navigation correction data broadcast service, sending, via a control channel, a broadcast request of the broadcast requests comprising information representing the defined geographical region and the regional portion of the respective portions of the satellite navigation correction data to a cell broadcast center device of the system, wherein the broadcasting comprises broadcasting, from the defined geographical region via a point-to-multipoint wireless broadcast of the respective point-to-multipoint wireless broadcasts, the regional portion of the respective portions of the satellite navigation correction data to the vehicle to facilitate the correction of the respective corrections of the satellite navigation data corresponding to the vehicle.

19. A non-transitory machine-readable medium, comprising executable instructions that, when executed by a processor, facilitate performance of operations, comprising:

obtaining satellite navigation correction data usable to facilitate a correction of satellite navigation data of a satellite navigation;

assigning respective portions of the satellite navigation correction data to defined geographical areas to facilitate broadcasts of the respective portions of the satellite navigation correction data from the defined geographical areas to respective vehicles within the defined geographical areas;

in response to receiving a satellite navigation correction data broadcast request from a vehicle of the respective vehicles, in response to the vehicle being determined to be authorized to receive the satellite navigation correction data, and, in response to determining, based on a wireless page that has been communicated between the vehicle and network equipment of a cell sector that is located in a defined geographical area of the defined geographical areas, that the vehicle is located within the defined geographical area, obtaining a first portion of the respective portions of the satellite navigation correction data that has been assigned to the defined geographical area; and sending, via a signaling channel, a system information block message comprising information representing the defined geographical area and the first portion of the respective portions of the satellite navigation correction data that has been assigned to the defined geographical area to a cell broadcast center device, wherein the cell broadcast center device is to further send the system information block message to a wireless access point device that is located within the defined geographical area, wherein the wireless access point device is to further transmit a point-to-multipoint broadcast comprising the system information block message to the vehicle to facilitate the correction, based on the first portion of the respective portions of the satellite navigation correction data, of a second portion of the satellite navigation data that has been received by the vehicle.

20. The non-transitory machine-readable medium of claim 19, wherein the operations further comprise:

in response to a request to access a fee-based satellite navigation correction data broadcast service within the defined geographical area being determined not to have been received from the vehicle that has been authorized to access the fee-based satellite navigation correction data broadcast service, disabling at least some of the broadcasts within the defined geographical area.

* * * * *